(12) United States Patent
Jordan et al.

(10) Patent No.: US 6,207,608 B1
(45) Date of Patent: *Mar. 27, 2001

(54) OLEFIN POLYMERIZATION WITH DIRECT USE OF ANSA-METALLOCENE AMIDE COMPLEXES AS CATALYSTS

(75) Inventors: Richard F. Jordan, Iowa City, IA (US); Il Kim, Ulsan (KR)

(73) Assignee: University of Iowa Research Foundation, Iowa City, IA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/689,442

(22) Filed: Aug. 9, 1996

(51) Int. Cl.⁷ ..................................................... B01J 31/00
(52) U.S. Cl. ..................... 502/152; 526/127; 526/133; 526/160; 526/943; 526/161; 502/103; 502/117; 502/132
(58) Field of Search ..................... 526/127, 133, 526/160, 943, 161; 502/103, 117, 132, 152

(56) References Cited

U.S. PATENT DOCUMENTS

| | | | |
|---|---|---|---|
| 3,242,099 | * 3/1966 | Manyik et al. | 502/117 |
| 4,042,610 | 8/1977 | Manzer | 260/429.3 |
| 4,855,468 | 8/1989 | Riediker et al. | 556/53 |
| 4,956,323 | 9/1990 | Hefner | 502/113 |
| 5,145,819 | 9/1992 | Winter et al. | 502/117 |
| 5,194,532 | 3/1993 | Hefner et al. | 526/126 |
| 5,208,304 | 5/1993 | Waymouth | 526/164 |
| 5,264,405 | 11/1993 | Canich | 502/103 |
| 5,268,495 | 12/1993 | Riepl et al. | 556/11 |
| 5,279,999 | 1/1994 | DeBoer et al. | 502/117 |
| 5,308,811 | * 5/1994 | Suga et al. | 502/62 |
| 5,385,877 | * 1/1995 | Fujita et al. | 502/103 |
| 5,434,115 | * 7/1995 | Yamada et al. | 502/103 |
| 5,468,781 | * 11/1995 | Sugano et al. | 521/60 |
| 5,495,035 | 2/1996 | Jordan et al. | 556/1 |
| 5,529,966 | * 6/1996 | Luciani et al. | 502/117 |
| 5,541,350 | * 7/1996 | Murata et al. | 556/10 |
| 5,561,092 | * 10/1996 | Ewen et al. | 502/117 |

FOREIGN PATENT DOCUMENTS

| | | |
|---|---|---|
| 0426637A2 | 5/1991 | (EP) . |
| 0427697A2 | 5/1991 | (EP) . |
| 0530908 A1 | 3/1993 | (EP) . |
| 0595390A1 | 5/1994 | (EP) . |

OTHER PUBLICATIONS

Walter Spaleck et al., *Organometallics* 1994, 13, 954–963.
Udo Stehling et al., *Organometallics* 1994, 13, 964–970.
Walter Kaminsky et al., *Makromol Chem.* 193, 1643–1651(1992).

John A. Ewen et al., *Makromol Chem., Macromol Symp.* 48/49, 253–295(1991).

Ronald L. Halterman, *Chem. Rev.* 1992, 92, 965–994.

William W. Ellis et al., *Organometallics* 1993, 12, 4391–4401.

Robert B. Grossman et al., *Organometallics* 1991, 10, 1501–1505.

Scott Collins et al., *Org. Chem.* 1989, 54, 4154–4158.

Scott Collins et al., *Journal of Organometallic Chemistry*, 342(1988)21–29.

Ferdinand R.W.P. Wild et al., *Journal of Organometallic Chemistry*, 288(1985)63–67.

Scott Collins et al., *Organometallics* 1991, 10, 2349–2356.

Mark S. Erickson et al., *Journal of Organometallic Chemistry* 415(1991)75–85.

Helga Wiesenfeldt et al., *Journal of Organometallic Chemistry*, 369(1989)359–370.

D.C. Bradley et al., *Proc. Chem. Soc.*, 1959, 225–226.

D.C. Bradley et al., *J. Chem. Soc.*, 1960, 3857–3861.

G. Chandra et al., *J. Chem. Soc.(A)*, 1968, 1940–1945.

Andrew K. Hughes et al., *Organometallics* 1993, 12, 1936–1945.

K. Issleib et al., *Z. Anorg. Allg. Chem.*, vol. 369, (1969) pp. 83–88.

Dormond et al., Journal of Organometallic Chemistry, 210 (1981) 83–90.

Ferdinand, R.W.P. Wild et al., J. Organomet. Chem., 232, pp. 233–247 (1982).

* cited by examiner

*Primary Examiner*—David W. Wu
*Assistant Examiner*—Ling-Sui Choi
(74) *Attorney, Agent, or Firm*—Zarley, Mckee, Thomte, Voorhees & Sease

(57) ABSTRACT

The process of preparing polyolefins using rac ansa-metallocene metal amide complexes directly by use of aluminum alkyl in combination with a cocatalyst.

10 Claims, No Drawings

OLEFIN POLYMERIZATION WITH DIRECT USE OF ANSA-METALLOCENE AMIDE COMPLEXES AS CATALYSTS

BACKGROUND OF THE INVENTION

This invention relates to the field, now well established, of use of ansa-metallocenes as catalysts. They are particularly useful as catalysts for the polymerization of ethylene and alpha olefins, such as propylene.

Conventional heterogeneous catalysts, such as Ziegler-Natta systems, have a variety of active sites, only some of which are stereo-specific. Obtaining a polymer with specific properties can involve a considerable amount of trial and error in order to find the best combination of catalyst, co-catalyst and stereo-regulator. In contrast, however, the active polymerization site in a metallocene catalyst is well defined, and can be modified in a straightforward manner via modification by the cyclopentadienyl ligands, enabling the structure of the polymer to be controlled with far greater precision.

A simple metallocene catalyst for polymerizing ethylene is $(C_5H_5)_2ZrCl_2$, which consists of a zirconium atom bound to two chlorine atoms and two cyclopentadienyl rings, and which is activated by cocatalysts such as methylaluminoxane (MAO). During the 1980's, ansa or bridged metallocenes, in which the cyclopentadienyl rings are linked by a chemical bridge, were found to be particularly useful for the polymerization of olefins. In particular, ansa-metallocene complexes, when used in combination with a cocatalyst such as methylaluminoxane (MAO), polymerize propylene to highly isotactic polypropylene, highly syndiotactic polypropylene, or atactic polypropylene, depending on the structure of the ansa-metallocene used.

As is well known, isotactic polymers have each pendant group attached to the backbone in the same orientation, whereas in syndiotactic polymers, these groups alternate in their orientations, and atactic polymers have a random arrangement of the groups along the backbone. Since the stereochemistry of the polymer has a great effect on its properties, it is desirable to control this feature. Chiral, $C_2$-symmetric ansa-metallocenes produce isotactic polypropylene.

While the greatest area of potential use for ansa-metallocene catalysts currently is for polymerization of olefins, such as ethylene and propylene, they also have significant uses as catalysts or catalyst precursors for other reactions where stereo-selectivity is important.

The utility of ansa-metallocene complexes as catalysts for olefin polymerization and other reactions has created a high demand for a practical synthesis of ansa-metallocene compounds.

In spite of this demand, current procedures for the synthesis of Group 4 (Ti,Zr,Hf) ansa-metallocenes require the use of ansa-bis-cyclopentadienyl dianion reagents and are hampered by low yields and tedious isomer separation and purification steps. Some of these problems have been discussed in Ellis, W. W.; Hollis, T. K.; Odenkirk, W., Whelan, J.; Ostrander, R.; Rheingold, A. L.; Bosnich, B. *Organometallics* 1993, 12, 4391. In particular, the synthesis of chiral $C_2$ symmetric ansa-metallocenes typically produces mixtures of desired rac (racemic) and undesired meso isomers. A typical synthesis of an ansa-metallocene complex is shown in Equation 1 below:

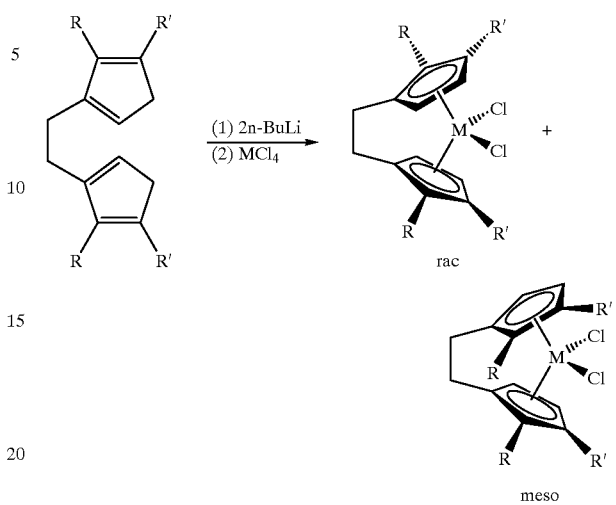
(Eq. 1)

This equation is typical of the process as shown in the art. See for example Spaleck, W.; Kuber, F., Winter, A.; Rohrman, J.; Bachmann, B.; Antberg, M.; Dolle, V.; Paulus, E. F. *Organometallics* 1994, 13, 954. Stehling, U.; Diebold, J.; Kirsten, R.; Roll, W.; Brintzinger, H. H.; Jungling, S.; Mulhaupt, R.; Langhauser, F. *Organometallics* 1994, 13, 964. Halterman, R. L. *Chem. Rev.* 1992, 92, 965. See also, for example, U.S. Pat. No. 5,145,819, U.S. Pat. No. 5,268, 495, and EPA 0-530-908-A1.

By way of further example, an important chiral Group 4 ansa-metallocene is rac-(EBI)$ZrCl_2$ (EBI=ethylene-1,2-bis (1-indenyl) which is currently prepared from $ZrCl_4$ and the dianion of the EBI ligand (Halterman, R. L. *Chem. Rev.* 1992, 92, 965). Brintzinger (Wild, F. R. W. P.; Wasiucionek, M.; Huttner, G., Brintzinger, H. H. *J. Organomet. Chem.* 1985, 288, 63) and Collins (Collins, S.; Kuntz, B. A.; Hong, Y. *J. Org. Chem.* 1989, 54, 4154; Collins, S.; Kuntz, B. A.; Taylor, N. J.; Ward, D. G. *J. Organomet. Chem.* 1988, 342, 21) used (EBI)$Li_2$ and reported low, variable yields (20–50%) of rac-(EBI)$ZrCl_2$. Buchwald employed (EBI)$K_2$ and obtained (EBI)$ZrCl_2$ in a rac/meso ratio of 2/1 in 70% yield. Grossman, R. B.; Doyle, R. A.; Buchwald, S. L. *Organometallics* 1991, 10, 1501. In general, current synthetic procedures produce the desired rac ansa-metallocenes in 10%–30% yield after tedious separation and purification steps, and even then separation of the rac from the meso products is not always possible.

Lappert et al. (Chandra, G.; Lappert, M. F. *J. Chem Soc.* (A) 1968, 1940) reported that certain Group 4 metallocene complexes are formed by the reaction of Group 4 metal amide complexes with cyclopentadiene compounds. However, this reaction yields only mono-cyclopentadienyl products when the metal is titanium, or when the cyclopentadiene compound is indene. This was ascribed to steric hindrance which disfavors addition of the second cyclopentadienyl ligand when the metal is small (titanium) or the cyclopentadienyl ligand is bulky (indenyl). Hefner. et al., also (U.S. Pat. No. 5,194,532) discusses the preparation of (indenyl)Ti(NMe$_2$)$_3$ by reaction of indene and Ti(NMe$_2$)$_4$. Ansa-metallocene complexes are not discussed in the Lappert or Hefner references.

An earlier invention of Richard F. Jordan, et al., entitled Synthesis of Ansa-Metallocene Catalysts, filed Jun. 1, 1994 and issued Feb. 27, 1996 as U.S. Pat. No. 5,495,035, and incorporated herein by reference, relates to a process of preparing rac ansa-metallocene amide complexes ((Cp—X—Cp)m(NRR')$_{n-2}$) in high yield by reacting an ansa-bis-cyclopentadiene, indene, fluorene, or substituted derivative thereof with a metal amide complex wherein the metal is a Group 4 metal, preferably zirconium, and R and R' (Eq. 2) are preferably hydrogen or $C_1$ to $C_{20}$ hydrocarbyl radicals, and more preferably $C_1$ to $C_4$ alkyl, and most preferably methyl. The resulting amide is converted to a chloride ((Cp—X—Cp)mCl$_{n-2}$) before use as a catalyst. It would be more efficient if a process could be developed which directly used the amide as a catalyst without the need for the conversion to the chloride.

It is therefore an object of the present invention to provide a process for producing polyolefins, particularly isotactic polypropylene from rac ansa-metallocene metal amide complexes directly without the need to convert the amide to a chloride before use as a catalyst.

The method of accomplishing the above objective, as well as others, will become apparent from the detailed description of the invention which follows.

SUMMARY OF THE INVENTION

The process of preparing polypropylene and other olefin polymers from rac ansa-metallocene metal amide complexes directly by use of an aluminum alkyl cocatalyst.

DETAILED DESCRIPTION OF THE INVENTION

In the present invention, ansa-metallocene complexes of general formula

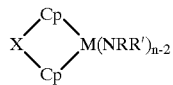

are prepared by reaction of metal amide complexes with ansa-bis-cyclopentadiene compounds as illustrated in Eq. 2.

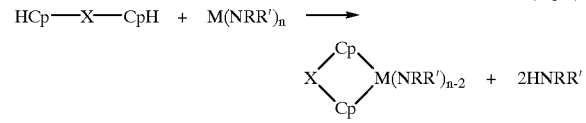

(Eq. 2)

R and R' represent hydrogen or hydrocarbyl radicals having from 1 to 20 carbon atoms, preferably from 1 to 4 carbon atoms. R and R' may also be silyl radicals $SiR_3$. R and R' may be linked.

Cp independently in each occurrence is a cyclopentadienyl, indenyl, fluorenyl or related group that can π-bond to the metal, or a hydrocarbyl, alkyl, aryl, silyl, halo, halohydrocarbyl, hydrocarbylmetalloid, or halohydrocarbylmetalloid substituted derivative thereof. Cp may contain up to 75 nonhydrogen atoms.

X may be any bridging or ansa group that is used to link the Cp groups, including, for example, silylene (-SiR$_2$-), benzo (C$_6$H$_4$) or substituted benzo, methylene (-CH$_2$) or substituted methylene, ethylene (-CH$_2$CH$_2$-), or substituted ethylene bridges.

M represents the metal used and is usually a Group 4 metal selected from the group consisting of titanium, zirconium and hafnium, but may also be a Group 3 (Sc,Y,La), Group 5 (V,Nb,Ta), Lanthanide or Actinide metal. Preferably it is a Group 4 metal, and most preferably it is zirconium.

The lower case letter "n" is a whole number, and is from 3 to 5. When M is a Group 4 metal or an Actinide, "n" is 4. When M is a Group 3 or Lanthanide metal, "n" is 3, and when M is a Group 5 metal, "n" is 5.

In particular, the rac isomers of chiral $C_2$-symmetric ansa-metallocenes are prepared in high yield. An example is the reaction of Zr(NMe$_2$)$_4$ with (EBI)H$_2$, shown below (Eq. 3). This reaction provides an efficient, high yield synthesis of pure rac-(EBI)Zr(NMe$_2$)$_2$, which can easily be converted to rac-(EBI)ZrCl$_2$ and related derivatives.

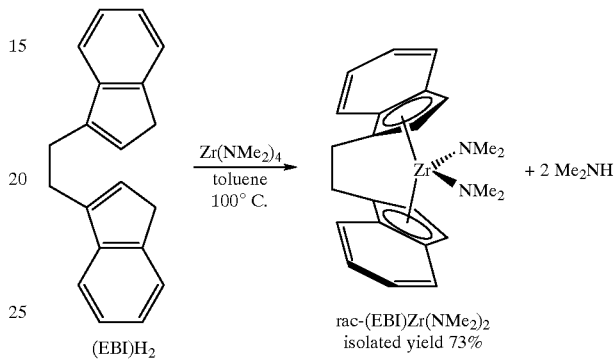

(Eq. 3)

The process of making each starting material for this reaction is known. In particular, the synthesis of ansa-bis-cyclopentadienes such as (EBI)H$_2$ is described in Halterman, R. L. *Chem. Rev.* 1992, 92, 965, and references therein.

The metal amide complexes M(NR'R')$_4$ can be prepared by reacting the corresponding metal tetrahalide complex such as zirconium tetrachloride with an appropriate lithium amide; see D. C. Bradley and I. M. Thomas, *Proc. Chem. Soc.*, 1959, 225; *J. Chem. Soc.* 1960, 3857. As earlier indicated, it is preferred that R and R' be hydrogen or $C_1$ to $C_{20}$ hydrocarbyl radicals, and preferably $C_1$ to $C_4$. Methyl is the most preferred and is illustrated in Eq. 3.

The reaction between the ansa-bis-cyclopentadiene and the metal amide can take place at any temperature from ambient, i.e. about 25° C. up to 250° C., preferably within the range of 8° C. to 125° C. At 100° C. the reaction is typically complete in less than 24 hours, and perhaps as few as 3 to 5 hours. The reaction is unaffected by room light and appears to be reversible.

The dimethylamine produced as a by-product in Eq. 3 is gaseous. It is preferred that this not be completely swept away by gas flushing during the reaction as it is believed that it may catalyze the conversion of initially-formed meso product to the desired rac product, therefore, ultimately yielding a higher ratio of rac/meso. This is believed the case because it has been observed that when the reaction flask is flushed with inert gas during the reaction, the yield of desired rac product decreases significantly.

While the use of metal amide complexes as starting materials is discussed above, if the NRR' groups are replaced with PRR' or SR groups, it is expected that equivalent results will be achieved. Likewise, amide complexes of the Group 3 metals, (Sc,Y,La) and Group 5 metals (V,Nb,Ta) may also be used, and it is expected that equivalent results will be achieved.

It is also expected that use of chiral, enantiomerically enriched metal amide complexes in Eq. 2 will allow the synthesis of enantiomerically enriched ansa-metallocenes.

The reaction desirably is conducted in the presence of a nonaqueous, nonalcoholic solvent that at least partially dissolves one of the reactants. Typical of such solvents are hydrocarbons such as benzene, toluene, and hexane, simple ethers, chlorinated hydrocarbons, acetonitrile, tetrahydrofuran, etc.

In the earlier incorporated by reference patent it was mentioned that it was believed that the metallocene amide complexes which are produced in Eq. 2 may, when activated by a suitable cocatalyst, be used as catalysts in many applications. Alternatively, the metallocene amide complexes which are produced in Eq. 2 may be converted to the more commonly used metallocene chloride complexes by a simple protonation reaction as described in Hughes, A. K.; Meetsma, A.; Teuben, J. H., *Organometallics* 1993, 12, 1936. No mention was made as to how the amide complexes may be used with a cocatalyst directly or what cocatalysts may be used. In this invention, it has been discovered that certain aluminum alkyls may be used as cocatalysts for metallocene amide catalysts to produce the desired polyolefins in high yield without the need to convert the metallocene amide to a metallocene chloride.

As previously discussed, practical application of ansa-metallocene catalysts is limited by the fact that the racemic (rac) isomers required for isotactic alpha olefin polymerization are difficult to prepare. However, as recently reported by Jordan et al., the amide complex rac(EBI)Zr(NMe$_2$)$_2$ can be prepared efficiently via an amine elimination route, which has since been extended to rac-(SBI)Zr(NMe$_2$)$_2$ (SBI= Me$_2$Si(1-indenyl)$_2$) and other ansa-metallocenes; see, Jordan et al., "Novel Synthesis of Ansa-Metallocene Catalysts", filed May 15, 1995, now U.S. Pat. No. 5,597,935 issued Jan. 28, 1997. These amide derivatives can be converted to the corresponding dichloride complexes, rac(EBI)ZrCl$_2$(1) and rac (SBI)ZrCl$_2$(2), which can then be used in polymerization reactions using standard procedures. However, as earlier explained, the efficiency of the amine elimination route could be more fully and economically exploited if the amide derivatives could be used directly in catalyst formulations. This invention describes a method allowing such direct use.

EXAMPLES

General Description

To determine if metallocene amide compounds could be activated for propylene polymerization by MAO, we compared the activities of 3/MAO and 4/MAO amide catalysts with conventional 1/MAO and 2/MAO chloride catalysts under the same conditions (48° C. 1 atm of propylene, Al/Zr ca. 1000/1, toluene; Table II runs 12–16). The amide-derived catalysts are significantly less active than the chloride-derived catalysts under these conditions, although the stereoselectivity is comparable. GPC results for the polymer produced by 3/MAO are consistent with single-site behavior.

One possible reason for the lower activities observed for the catalysts based on metal amide complexes is that these amide complexes are not efficiently alkylated by MAO (or the AlMe$_3$ contained therein). In an effort to circumvent this potential problem, the amides were pretreated with excess AlR$_3$ prior to activation with MAO, such that the total Al/Zr ratio was maintained in the range 800/1 to 1300/1. The results of these examples using AlMe$_3$ or Al($^i$Bu)$_3$ are summarized in Table II, runs 17–22. This procedure produces catalysts with activities and stereoselectivities which are comparable to those of the chloride catalysts under the conditions studied. The prealkylation procedure can also be used with CPh$_3$+ and HNR$_3$+ cocatalysts, as illustrated by runs 22–33. GPC results for representative examples are characteristic of single-site behavior.

While not wishing to be bound by any particular theory, it is believed that mixture of the ansa-metallocene amide, the aluminum alkyl and the cocatalyst generates a cationic ansa-metallocene alkyl species which is the active species in these catalyst systems.

The metallocene amide derivatives are activated for propylene polymerization by initial alkylation with AlR$_3$ reagents and subsequent reaction with MAO or other activators which generate cationic metallocene alkyl species. Thus these easily-prepared metallocenes can be used directly in catalyst formulations without conversion to dichloride complexes.

The aluminum alkyl, i.e. Al(R''')$_3$ may be C$_1$ to C$_{20}$ alkyl, preferably C$_1$ to C$_4$ alkyl. The amount of the aluminum alkyl may be from 1 to 10,000 μmol per μmol of metallocene amide, preferably 8 to 2000 μmol per μmol of metallocene amide. It is preferred that the amount of aluminum alkyl be from 8 to 1000 μmol per μmol of metallocene amide. The important point is that there must be sufficient aluminum alkyl to provide at least one hydride or alkyl group on the metallocene complex. As shown in the examples below, the aluminum alkyl AlR''''$_3$ is simply added during the process at the same time as the amide catalyst. Generally, satisfactory amounts can be achieved when equal amounts of both cocatalysts are used.

The following specific examples are offered to further illustrate but not limit the process of the present invention and present the data of Tables I and II as discussed above.

Example 1

The ansa-metallocene rac-(EBI)Zr(NMe$_2$)$_2$ has been prepared in high yield from Zr(NMe$_2$)$_4$ and (EBI)H$_2$ (Eq. 3). In a typical reaction, under N$_2$ atmosphere, Zr(NMe$_2$)$_4$ (0.50 g, 1.9 mmol) and (EBI)H$_2$ (0.48 g, 1.9 mmol) were placed in a Schlenk vessel containing a Teflon stir bar. Toluene (50 ml) was added. The reaction mixture was stirred and heated to 100° C. for 17 hours. During this period, the HNMe$_2$ co-product was allowed to escape freely (via an oil bubbler) from the reaction vessel. Removal of solvent under reduced pressure afforded an orange solid which was shown by $^1$H NMR to be (EBI)Zr(NMe$_2$)$_2$ in a rac/meso ration of 10/1, in 90% yield. Recrystallization from hexane afforded pure rac-(EBI)Zr(NMe$_2$)$_2$ in 73% isolated yield (0.59 g). The rac-(EBI)Zr(NMe$_2$)$_2$ was characterized by $^1$H and $^{13}$C NMR, elemental analysis, and an X-ray crystal structure determination.

It was also shown that rac-(EBI)Zr(NMe$_2$)$_2$ reacts with two equivalents of Me$_2$NH.HCl to give rac-(EBI)ZrCl$_2$ in high isolated yield (Eq. 4). In a typical reaction, under N$_2$ atmosphere, a solution of Me$_2$NH.HCl (0.093 g, 1.14 mol) in CH$_2$Cl$_2$ (20 ml) was added dropwise to a stirred solution of rac-(EBI)Zr(NMe$_2$)$_2$ (0.25 g, 0.57 mmol) at −78° C. The resulting clear, yellow solution was stirred at room temperature for 30 mins. The solvent was removed under reduced pressure, and the resulting solid was washed with hexane (15 ml) and extracted with toluene (70 ml). Removal of the solvent from the toluene extract under reduced pressure gave pure rac-(EBI)ZrCl$_2$ in 92% isolated yield (0.22 g).

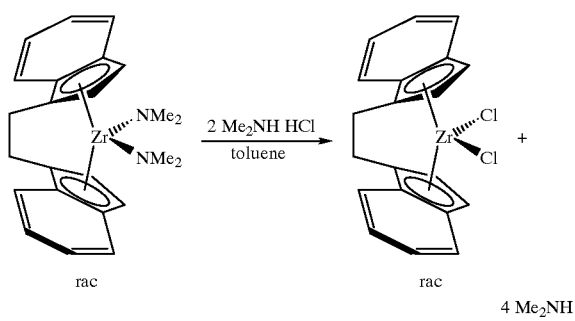

(Eq. 4)

rac → rac

2 Me₂NH HCl / toluene

4 Me₂NH

The following additional examples were run using the basic synthesis shown in Example 1 and are presented here for succinctness in table form.

TABLE I

Synthesis of rac-(EBI)Zr(NMe₂)₂ in high yield
Insert Table from p. 11 of previous application

| Example No. | solvent | temp (° C.) | reaction time (hours) | system used | (EBI)Zr(NMe₂)₂ as % of crude product | rac/meso ratio of crude product | % isolated rac-(EBI)Zr(NMe₂)₂ (crystallized from) |
|---|---|---|---|---|---|---|---|
| 2 | toluene | 100 | 48 | N₂ purge[a] | 90 | 1/1 | 25 (toluene) |
| 3 | toluene | 100 | 26 | partial N₂ purge[a] | 80 | 4/1 | — |
| 4 | toluene | 100 | 17 | N₂ purge[a] | 90 | 1/1 | — |
| 5 | chlorobenzene | 125 | 17 | open[c] | 90 | 9/1 | 70 (hexane) |
| 6 | toluene | 100 | 117 | open[c] | <60 | 60/1 | — |
| 7 | toluene | 100 | 12 | pressure release[d] | 85 | 10/1 | 75 (toluene) |
| 8 | toluene | 100 | 18 | closed[e] | 50 | 1/1 | — |
| 9 | toluene | 100 | 17 | open[c] | 90 | 13/1 | 68 (toluene) |
| 10 | toluene | 100 | 18 | open, dark[f] | 90 | 13/1 | — |
| 11 | THF | 67 | 20 | open[c] | 50 | 2/1 | — |

[a] N₂ bubbled through reaction solution to drive off HNMe₂ as it is formed
[b] N₂ bubbled through reaction solution only for part of reaction time
[c] HNMe₂ allowed to escape freely (via an oil bubbler) from reaction vessel
[d] HNMe₂ allowed to escape from reaction vessel via a mercury bubbler
[e] Closed system, HNMe₂ is retained in reaction vessel
[f] As for (c) except reaction vessel wrapped in aluminum foil to exclude light Examples 2–11 demonstrate that ansa-metallocene amide complexes were prepared in pure rac form in high yields without the use of ansa-bis-cyclopentadienyl dianion reagents. The yields are substantially higher than the traditional prior art yields of 10% to 30%. The following examples 12–33, as set forth in Table II, show the effectiveness of the amides directly in catalyst formulations with aluminum alkyls and MAO or other cocatalysts.

Propylene (99.5%, polymer grade, Matheson) was purified by passage through a Matheson 6410 gas purification column. Toluene was distilled from sodium under nitrogen.

Propylene polymerizations were performed in a 250 mL Fisher-Porter reactor equipped with a mechanical stirrer and a temperature probe. In a drybox the reactor was charged with toluene (120 mL), and the prescribed amount of alkyl aluminum reagent was added. The metallocene compound (2.5 mg) was then added. After the metallocene dissolved, the cocatalyst MAO, [Ph₃C][B(C₆F₅)₄], [HNMe₂Ph][B(C₆F₅)₄] or [HNMePh₂][B(C₆F₅)₄] was added. The reactor was immersed in a constant-temperature bath previously set to the desired temperature, and the stirrer was turned on. When the reactor temperature had equilibrated to the bath temperature, polymerization was initiated by pressurizing the reactor with propylene (1 atm). The pressure was maintained at 1 atm. Polymerization was quenched by addition of EtOH (ca. 200 mL) followed by concentrated HCl (20 mL). The polypropylene was isolated by filtration, washed several times with EtOH, and dried (70° C., vacuum oven, overnight).

Molecular weights and molecular weight distributions were measured by GPC (Waters 150° C.) at 135° C. in 1,2-dichlorobenzene. Polymer melting points were measured with a Perkin-Elmer DSC-4 system at a heating rate of 10° C./min. $^{13}C$ NMR spectra were recorded on a Bruker AMX-360 spectrometer at 120° C. NMR samples were prepared by dissolving 100 mg of polymer in 0.5 mL of $C_6D_6$/1,2,4-trichlorobenzene (1/5) in a 5 mm tube. Regiochemical errors (1–3 insertion) were detected (ca. 1.0–1.8% for (EBI)Zr catalysts and 0.7–1.2% for (SBI)Zr catalysts).

TABLE II

Propylene polymerization results (toluene, P = 1 atm, T = 48° C.).

| run | cat[a] | μmol cat | AlR$_3$ | μmol AlR$_3$ | cocat[b,c] | μmol cocat | time min | yield g | Activity 10$^6$ g/(mol Zr*h) | % mmmm | T$_m$ (° C.) | M$_w$ × 10$^{-3}$ | M$_w$/M$_n$ |
|---|---|---|---|---|---|---|---|---|---|---|---|---|---|
| 1 | 3 | 5.7 | — | — | MAO | 5600 | 60 | 1.6 | 0.27 | 74.9 | | | |
| 2 | 3 | 5.7 | — | — | MAO | 5800 | 60 | 1.5 | 0.26 | — | 135.1 | 29.4 | 1.9 |
| 3 | 4 | 5.4 | — | — | MAO | 5200 | 60 | 5.2 | 0.97 | 79.0 | | | |
| 4 | 1 | 5.9 | — | — | MAO | 5800 | 96 | 63.2 | 6.7 | 73.4 | | | |
| 5 | 2 | 5.5 | — | — | MAO | 4300 | 106 | 64.5 | 6.6 | 81.5 | | | |
| 6 | 3 | 5.7 | AlMe$_3$ | 520 | MAO | 4300 | 90 | 50.5 | 5.9 | 79.8 | | | |
| 7 | 3 | 5.7 | AlMe$_3$ | 2080 | MAO | 5000 | 60 | 34.8 | 6.1 | — | 128.8 | 11.9 | 1.9 |
| 8 | 3 | 5.7 | Al($^i$Bu)$_3$ | 200 | MAO | 4300 | 90 | 56.8 | 6.6 | 76.9 | | | |
| 9 | 3 | 5.7 | Al($^i$Bu)$_3$ | 2000 | MAO | 5000 | 60 | 46.2 | 8.1 | — | 134.8 | 25.4 | 2.1 |
| 10 | 4 | 5.4 | AlMe$_3$ | 2080 | MAO | 4300 | 90 | 70.8 | 8.7 | 82.9 | | | |
| 11 | 4 | 5.4 | Al($^i$Bu)$_3$ | 790 | MAO | 4200 | 60 | 34.2 | 6.3 | — | 135.9 | 33.9 | 2.2 |
| 12 | 3 | 5.7 | AlMe$_3$ | 520 | CPh$_3$+ | 5.7 | 126 | 31.3 | 2.6 | 82.1 | | | |
| 13 | 3 | 5.7 | Al($^i$Bu)$_2$H | 280 | CPh$_3$+ | 5.4 | 85 | 50.3 | 6.3 | 69.2 | | | |
| 14 | 3 | 5.7 | AlPr$_3$ | 260 | CPh$_3$+ | 5.4 | 100 | 51.5 | 5.4 | 72.2 | | | |
| 15 | 3 | 5.7 | AlMe$_3$ | 520 | HNMePh$_2$+ | 5.7 | 96 | 19.6 | 2.1 | 80.0 | | | |
| 16 | 3 | 5.7 | AlMe$_3$ | 520 | HNMePh$_2$+ | 5.7 | 66 | 30.0 | 4.8 | 76.2 | | | |
| 17 | 3 | 5.7 | Al($^i$Bu)$_2$H | 560 | HNMePh$_2$+ | 5.7 | 150 | 30.5 | 2.1 | — | | | |
| 18 | 4 | 5.6 | AlMe$_3$ | 2080 | CPh$_3$+ | 6.3 | 66 | 60.9 | 9.9 | 78.8 | | | |
| 19 | 4 | 5.4 | AlPr$_3$ | 260 | CPh$_3$+ | 5.4 | 60 | 32.3 | 5.9 | 86.3 | | | |
| 20 | 4 | 5.4 | Al($^i$Bu)$_3$ | 1000 | CPh$_3$+ | 6.0 | 90 | 49.1 | 6.1 | 79.6 | | | |
| 21 | 4 | 5.4 | AlMe$_3$ | 2080 | HNMePh$_2$+ | 7.5 | 77 | 53.1 | 7.5 | 81.5 | | | |
| 22 | 4 | 5.3 | AlMe$_3$ | 1000 | HNMePh$_2$+ | 5.2 | 60 | 44.2 | 8.5 | — | 141.3 | 29.4 | 1.9 |

[a]1 = rac-(EBI)ZrCl$_2$; 2 = rac-(SBI)ZrCl$_2$; 3 = rac-(EBI)Zr(NMe$_2$)$_2$; 4 = rac-(SBI)Zr(NMe$_2$)$_2$.
[b]mmol MAO = mmol Al; of which 82 wt % = "AlMeO" and 18 wt % = AlMe$_3$.
[c]Anion = B(C$_6$F$_5$)$_4$ for CPh$_3$+ and HNR$_3$+ cocatalysts.

The data of Table II have been discussed in the earlier example, general description section, and as can be seen, demonstrate that the invention accomplishes its stated objectives. Certain modifications of the procedures and reactants can be made without departing from the spirit and scope of the invention.

What is claimed is:

1. Catalysts for the high activity polymerization of α-olefins, comprising:

an ansa-metallocene metal amide complex of the formula:

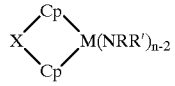

wherein Cp independently and in each occurrence is cyclopentadienyl, indenyl, or fluorenyl, or a hydrocarbyl, alkyl, aryl, silyl, halo, halohydrocarbyl, hydrocarbylmetalloid, or halohydrocarbylmetalloid substituted derivative of said cyclopentadienyl, indenyl, or fluorenyl, X is a bridging group which links the Cp groups, M is a metal selected from the group consisting of Group 3, 4, and 5 metals, R and R' are the same or different and are each hydrogen or hydrocarbyl radicals of from C$_1$ to C$_{20}$, or silyl radicals, and n is from 3 to 5; and an aluminum alkyl of the formula Al(R''')$_3$ wherein R''' is C$_1$ to C$_{20}$ hydrocarbyl radical, and a cocatalyst selected from the group consisting of alumoxanes, triarylcarbenium salts, ammonium salts, silver salts, ferrocenium salts, tris(pentafluorophenyl) borane and magnesium dichloride wherein the ansa-metallocene metal amide and the aluminum alkyl are combined before the cocatalyst is added and wherein the order of combination forms a cationic ansa-metallocene alkyl complex active species wherein the active species has a high olefin polymerization activity.

2. The catalyst of claim 1 wherein the amount of aluminum alkyl is an amount sufficient to provide at least one alkyl group on the metallocene complex.

3. The catalyst or claim 1 wherein the amount of aluminum alkyl is from 1 μmol to 10,000 μmol per μmole of metallocene amide.

4. The catalyst of claim 2 wherein the amount of aluminum alkyl is from 8 μmol to 2000 μmol per μmole of metallocene amide.

5. A method of forming polymers of α-olefins using a high activity ansa-metallocene amide catalyst, an aluminum alkyl, said aluminum alkyl having the formula Al(R''')$_3$ wherein R''' is C$_1$ to C$_{20}$ hydrocarbyl radical, and a cocatalyst selected from the group consisting of alumoxanes, triarylcarbenium salts, ammonium salts, silver salts, and ferrocenium salts, tris(pentafluorophenyl)borane and magnesium dichloride, said method comprising:

preparing a catalyst composition which comprises a metal amide complex of the formula:

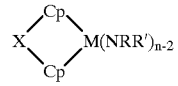

wherein Cp independently and in each occurrence is cyclopentadienyl, indenyl, or fluorenyl, or a hydrocarbyl, alkyl, aryl, silyl, halo, halohydrocarbyl, hydrocarbylmetalloid, or halohydrocarbylmetalloid substituted derivative of said cyclopentadienyl, indenyl, or fluorenyl, X is a bridging group which links the Cp groups, M is a metal selected from the group consisting of Group 3, 4, and 5 metals, R and R' are the same or different and are each hydrogen or hydrocarbyl radicals of from C$_1$ to C$_{20}$, or silyl radicals, and n is from 3 to 5; and an aluminum alkyl of the formula Al(R''')$_3$ wherein R''' equals an alkyl group of C$_1$ to C$_{20}$ carbon atoms, and thereafter adding a cocatalyst selected from the group consisting of alumoxanes, triarylcarbenium salts, ammonium salts, silver salts, and ferrocenium salts, and tris(pentafluorophenyl)borane and magnesium chloride; and thereafter contacting the catalyst and cocatalyst composition with an α-olefin under conditions to effect polymerization wherein the catalyst is an ansa-metallocene alkyl compound and wherein the combination of catalyst and cocatalyst forms a cationic ansa-metallocene alkyl complex active species wherein the active species has a high olefin polymerization activity.

6. The method of claim 5 wherein the amount of aluminum alkyl is an amount sufficient to provide at least one alkyl moiety on the metallocene complex.

7. The method of claim 5 wherein the amount of aluminum alkyl cocatalyst is from 1 $\mu$mol to 10,000 $\mu$mol per $\mu$mole of metallocene amide.

8. The method of claim 7 wherein the amount of aluminum alkyl cocatalyst is from 8 $\mu$mol to 2,000 $\mu$mol per $\mu$mole of metallocene amide.

9. The method of claim 7 wherein R'" is a $C_1$ to $C_8$ alkyl group.

10. A method of preparing a catalyst comprising:

mixing a metallocene amide complex with an aluminum alkyl of the formula Al(R'")3 wherein R'" is $C_1$ to $C_8$ alkyl to form a first mixture and thereafter mixing the first mixture with aluminoxane.

* * * * *